March 30, 1965   J. L. CHENGGES   3,175,672
SHOCK ABSORBING CONVEYOR DEVICE
Filed July 2, 1963
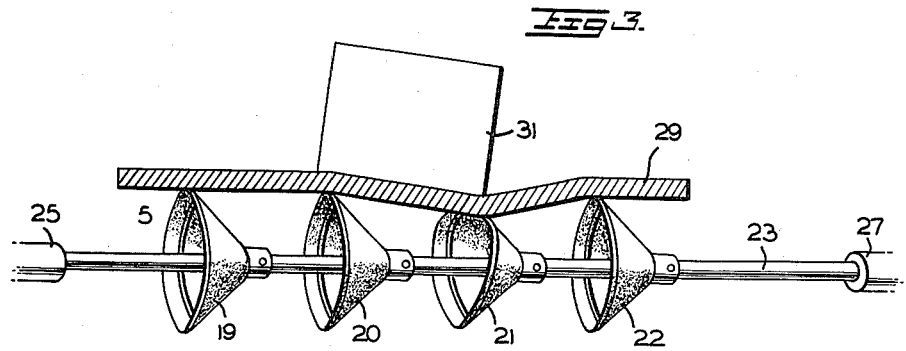
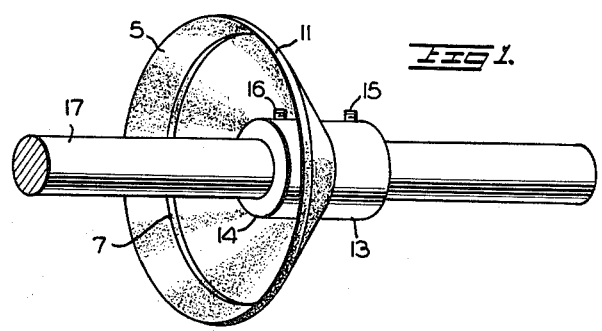
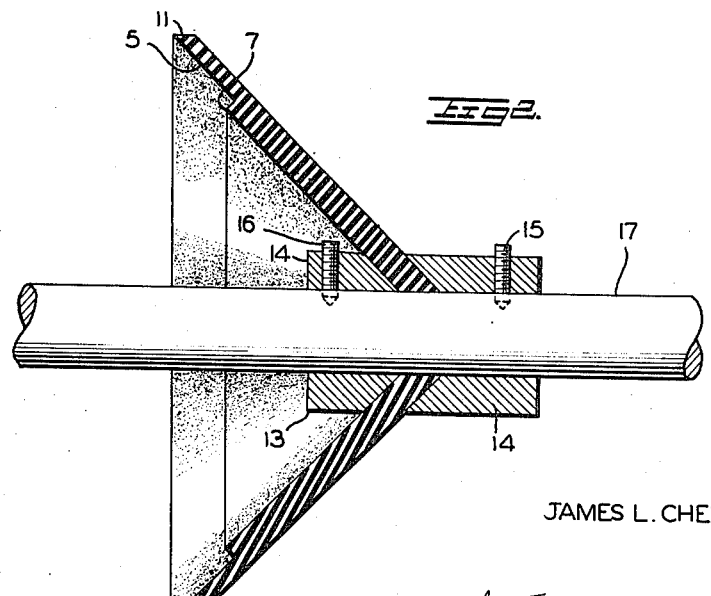
INVENTOR
JAMES L. CHENGGES
BY J T Comfort
ATTORNEY

United States Patent Office 3,175,672
Patented Mar. 30, 1965

3,175,672
SHOCK ABSORBING CONVEYOR DEVICE
James L. Chengges, Roanoke, Va., assignor to General Electric Company, a corporation of New York
Filed July 2, 1963, Ser. No. 292,379
2 Claims. (Cl. 198—1)

This invention relates to a conveyor system and more particularly to a conveyor system with a shock absorbing device for absorbing the impact of objects dropped on a conveyor belt.

In a conveyor system the objects being handled are often dropped onto the conveyor belts at loading or transfer points. The objects, such as parcels, mailbags, and the like, are often dropped from a height of two to four feet, and at times from even greater heights. Since the objects may also weigh up to 200 pounds, the force of the impact of such objects hitting a conveyor belt will be large. Normally the conveyors at the point of impact are supported by a flat plate and a nest of hard rollers. The impact of an object hitting the conveyor belt tends not only to damage the object or its contents, but also to damage the nest of rollers and the lacing of the conveyor belt, thereby decreasing the life of the conveyor belt itself.

Heretofore, efforts have been made to solve the problem in several ways. The nest of rollers and the flat supporting plate have been removed so that the object hits the conveyor alone. The slack in the conveyor belt absorbs the shock to a certain degree, but puts a strain on the belt and the lacing. This substantially reduces the life of the conveyor belt. A continuous cushioning belt has been provided below the transfer or loading point traveling at the same speed of the conveyor belt itself. Such a device is satisfactory to a certain degree, but is an expensive solution.

It is therefore an object of this invention to provide a new and improved device for absorbing the impact of an object dropped on a conveyor belt.

Another object of this invention is to provide a new and improved device for absorbing the impact of an object dropped on a conveyor belt to decrease the injury to the conveyor belt, the belt lacing, and the object itself.

Accordingly, at least one coned roller of a resiliently rigid material is placed under the conveyor belt at the point of impact of the object dropped. The coned roller edge engages the moving conveyor belt. When an object is dropped onto the conveyor belt, the coned roller is deflected to absorb the impact. As the coned roller rotates with the movement of the conveyor belt, the base of the coned roller quickly regains its circular dimension to return the conveyor belt to its previous level. The coned roller operates as a cantilever spring in absorbing the impact shock of the dropped object.

An alternative feature of this invention is that the coned roller may have a tapered or varying side thickness so that the deflection of the coned roller will vary according to the magnitude of the force of the impact.

The invention is set forth with particularity in the appended claims. The principles and characteristics of the invention, as well as other objects and advantages are revealed and discussed through the medium of the illustrative embodiments appearing in the specification and drawings which follow.

In the drawings:
FIGURE 1 shows one coned roller mounted on a shaft.
FIGURE 2 shows a side cut-away view of a coned roller.
FIGURE 3 shows a plurality of coned rollers supporting a conveyor belt at the time of impact of an object hitting the conveyor belt.

Referring now to FIGURES 1 and 2, a coned roller 5 has a slant height of ten inches and a base with a diameter of ten inches. The altitude of the coned roller 5 is five inches and the thickness of the cone at its vertex is one inch. The thickness of the coned roller is decreased to a half inch at a point one and a half inches from the base of the cone. A half inch edge 11 on the base of the coned roller is parallel to the altitude of the coned roller. The coned roller 5 is secured to a metal collar 13 by a metal to rubber glue on the outside. A second collar 14 on the inside is not bonded to the cone. These collars are machined at an incline to obtain the desired fit when assembled. The roller itself is molded resiliently rigid rubber material. The collars 13 and 14 are removably secured to a rotatable shaft 17 by set screws 15 and 16, respectively.

The coned roller may be fabricated in several ways. Molding of the coned roller has proved satisfactory because of the desired variation in thickness in the wall of the coned roller. However, the coned rollers may also be stamped from sheets of rubber, and formed into the coned shape. A second cone having a different slant height can also be formed and glued inside the first cone to provide the desired variations in thickness of the side wall of the coned roller.

Referring now to FIGURE 3, four coned rollers, 19–22, identical to the one shown in FIGURES 1 and 2 and described with relation thereto, are mounted on a shaft 23. The shaft 23 is supported at both ends by roller bearings 25 and 27. Conveyor belt 29 is supported by the coned rollers 19–22 so that the coned rollers rotate in synchronism with the movement of the conveyor belt 29. A cross-sectional area of the belt 29 is the only portion of the conveyor belt 29 shown.

The coned rollers 19–22 are rigid enough to support the conveyor belt 29 and objects traveling thereon without any deflection of the coned rollers 19–22. The coned rollers 19–22 deflect with the impact of an object such as the object 31 shown dropping onto the conveyor belt 29 above the coned rollers 19–22. The amount of the deflection of coned rollers 19–22 varies with the force of the impact. The deflection of the coned rollers 19–22 may be varied by the choice of the material of which the coned rollers 19–22 are fabricated and the thickness of the side wall of the coned rollers as shown in FIGURES 1 and 2.

An object 31 is shown on conveyor belt 29 at the moment of impact after having been dropped onto the conveyor belt 29. The conveyor belt 29 is depressed under the impact and coned rollers 19–22 deflected. Coned roller 21 is shown substantially deflected as the point of impact of the dropped object 31 is directly over coned roller 21. Coned roller 21 is also deflected, although not as much as coned roller 21, as the major impact force is absorbed by coned roller 21. Coned rollers 19 and 22 are also slightly deflected.

The coned rollers are normally spaced on the shaft 23 at approximtely one foot intervals. The number of shafts with coned rollers thereon required under the conveyor belt 29 depends on the area on which objects will be dropped. Four shafts with a two feet space between each shaft, with each shaft having four coned rollers thereon has proved satisfactory.

The coned rollers 19–22 tend to wear with use, and may be adjusted by raising the shaft 23 until the edge of each coned roller 19–22 is in frictional engagement with the conveyor belt 29.

*Operation*

The coned rollers 19–22 in frictional engagement with the conveyor belt 29 rotate in synchronism with the movement of the conveyor belt 29. An object 31 such as a parcel, mailbag, or the like, is dropped onto the conveyor belt 29 as the conveyor belt 29 is stationary or moving. The impact of the dropped object 31 depresses the conveyor belt 29 at the point of impact substantially and to a lesser degree depresses the surrounding area. The coned roller 21 under the point of impact is substantially deflected approximately 2½ inches to flatten the side of that portion of the coned roller supporting the conveyor belt at the moment of impact. The other coned rollers 19, 20 and 22 are also deflected to a certain degree, flattening the side of that portion of the coned rollers supporting the conveyor belt 29 at the moment of impact. The deflection or flattening of the coned rollers 19, 20 and 22 is less than that of coned roller 21 as coned roller 21 receives and absorbs the major impact force as coned roller is directly under the point of impact of object 31.

The conveyor belt 29 continues to move during and after impact of the object 31 and the deflection of the coned rollers 19–22. As the coned rollers remain in frictional engagement with the conveyor belt 29, the coned rollers continue to rotate during and after the impact of the object 31. The bases of the coned rollers 19–22 therefore regain their circular dimension immediately to return the conveyor belt 29 to its previous level and support the conveyor belt 29 and any objects traveling on the conveyor belt 29. The conveyor belt 29 and the supporting coned rollers 19–22 are therefore ready to receive another object dropped onto the belt.

In summary a new and improved shock absorbing conveyor device has been described. One or more coned rollers of a resiliently rigid material is frictionally engaged under the conveyor belt at the point of impact of an object dropped onto the conveyor belt. When an object is dropped onto the conveyor belt, the belt is depressed deflecting the supporting coned roller to absorb the impact of the dropped object. As the coned roller continues to rotate, the base of the coned roller regains its circular shape to lift the conveyor belt back to its former level.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefor contemplated by the appended claims to cover all such modifications as fall within the scope and spirit of the invention.

What is claimed is:

1. In a shock absorbing device for absorbing the impact of an object dropped on a moving conveyor belt at a predetermined location, the improvement comprising a plurality of coned rollers backing the underside of said conveyor belt, said coned rollers axially rotatable upon contact with said moving conveyor belt, and constructed to have a cantilever spring action to absorb the impact of an object dropped on said conveyor belt.

2. In a shock absorbing device for absorbing the impact of an object dropped on a moving conveyor belt at a predetermined location, the improvement comprising a plurality of coned rollers backing the underside of said conveyor belt, said coned rollers axially rotatable upon contact with said moving belt, said coned rollers of a resiliently rigid material with the side of said coned rollers varying in thickness and constructed to have a cantilever spring action to absorb the impact of an object dropped on said conveyor belt.

References Cited in the file of this patent

UNITED STATES PATENTS

| | | | |
|---|---|---|---|
| 2,277,402 | 3/42 | Hoeck | 198—192 |
| 2,622,447 | 12/52 | Murphy | 198—192 X |
| 2,647,618 | 8/53 | McLachlan | 198—192 |
| 2,974,777 | 3/61 | Marsh | 198—192 |
| 3,029,655 | 4/62 | Morrow | 198—202 X |
| 3,126,997 | 3/64 | Corbin | 198—184 |

FOREIGN PATENTS

| | | |
|---|---|---|
| 922,704 | 4/63 | Great Britain. |

SAMUEL F. COLEMAN, *Primary Examiner.*